July 18, 1933.  F. J. HOHNHORST ET AL  1,918,392
ABRADING WHEEL AND MOUNTING THEREFOR
Filed March 13, 1930  7 Sheets-Sheet 1
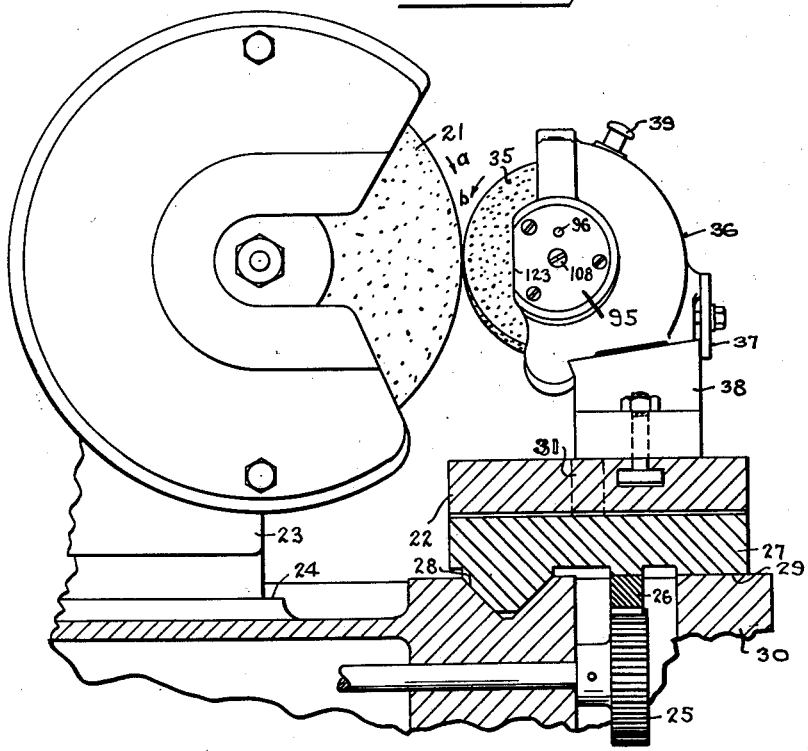
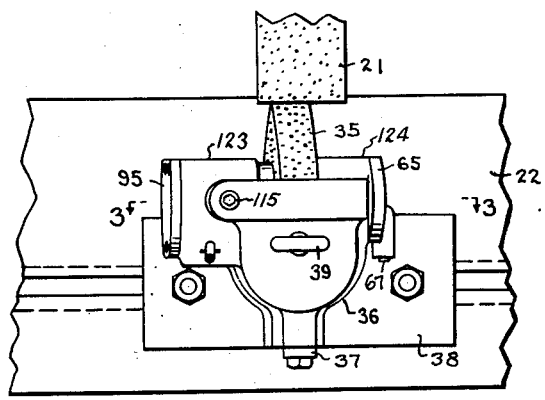

July 18, 1933.   F. J. HOHNHORST ET AL   1,918,392
ABRADING WHEEL AND MOUNTING THEREFOR
Filed March 13, 1930   7 Sheets-Sheet 2

INVENTORS:
Ferdinand J. Hohnhorst,
Ferdinand J. Kroeger,
BY H. P. Derbfot,
ATTORNEY.

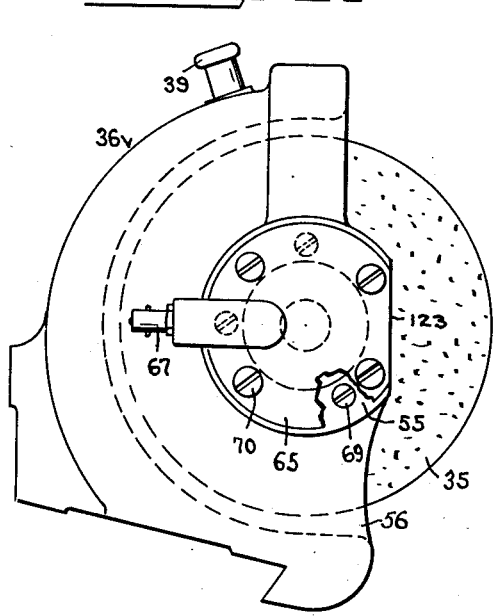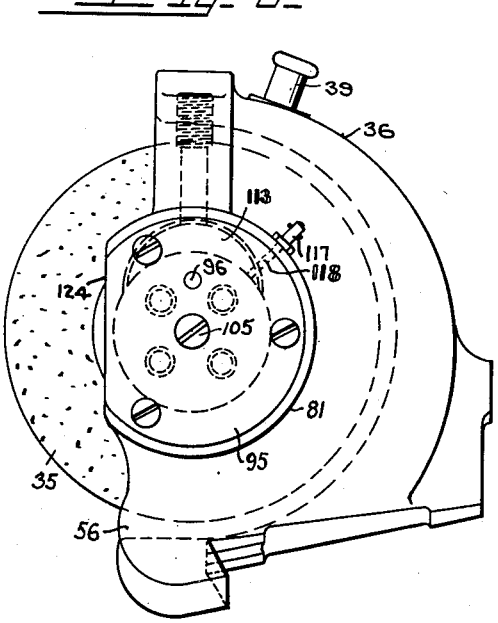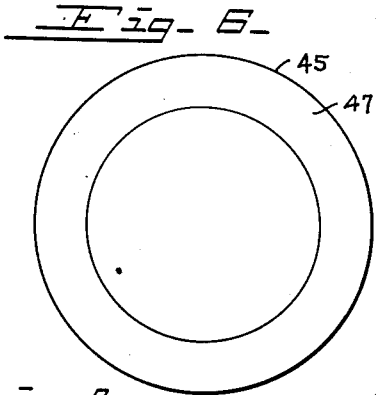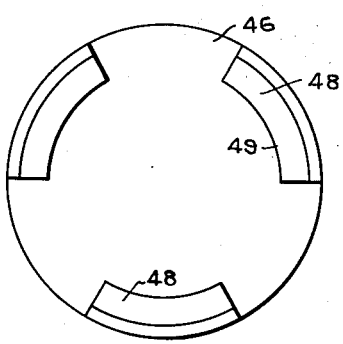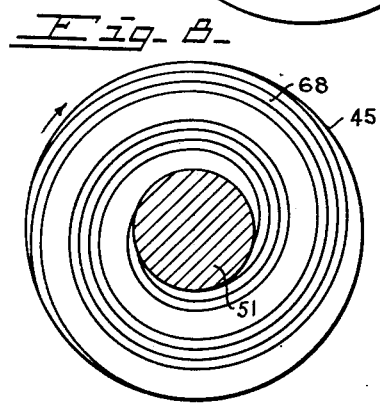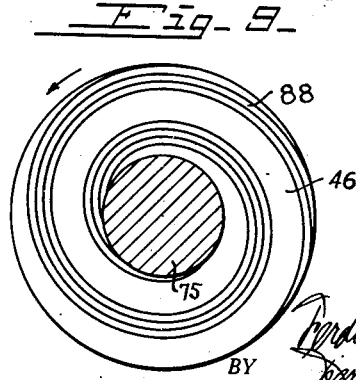

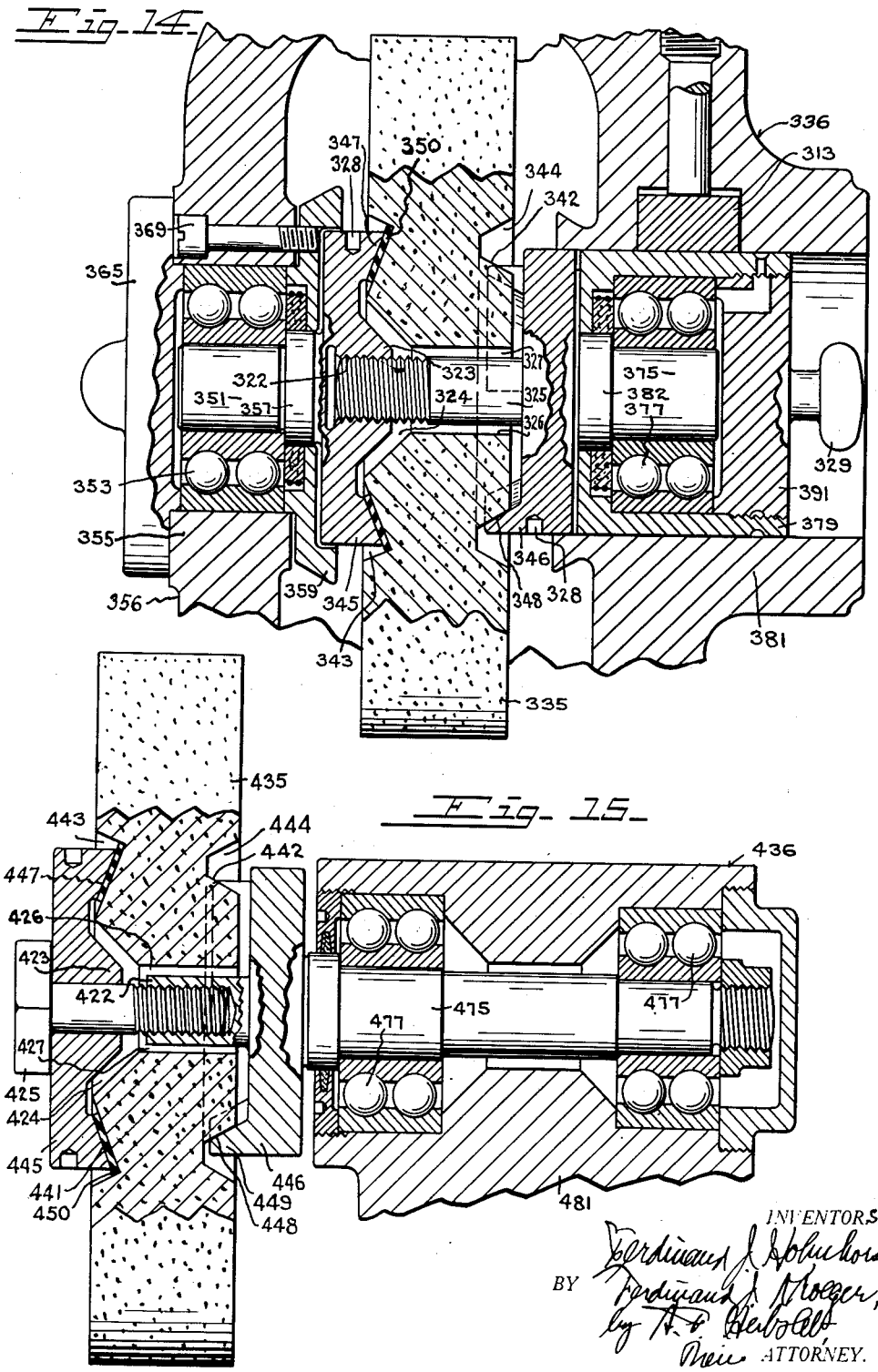

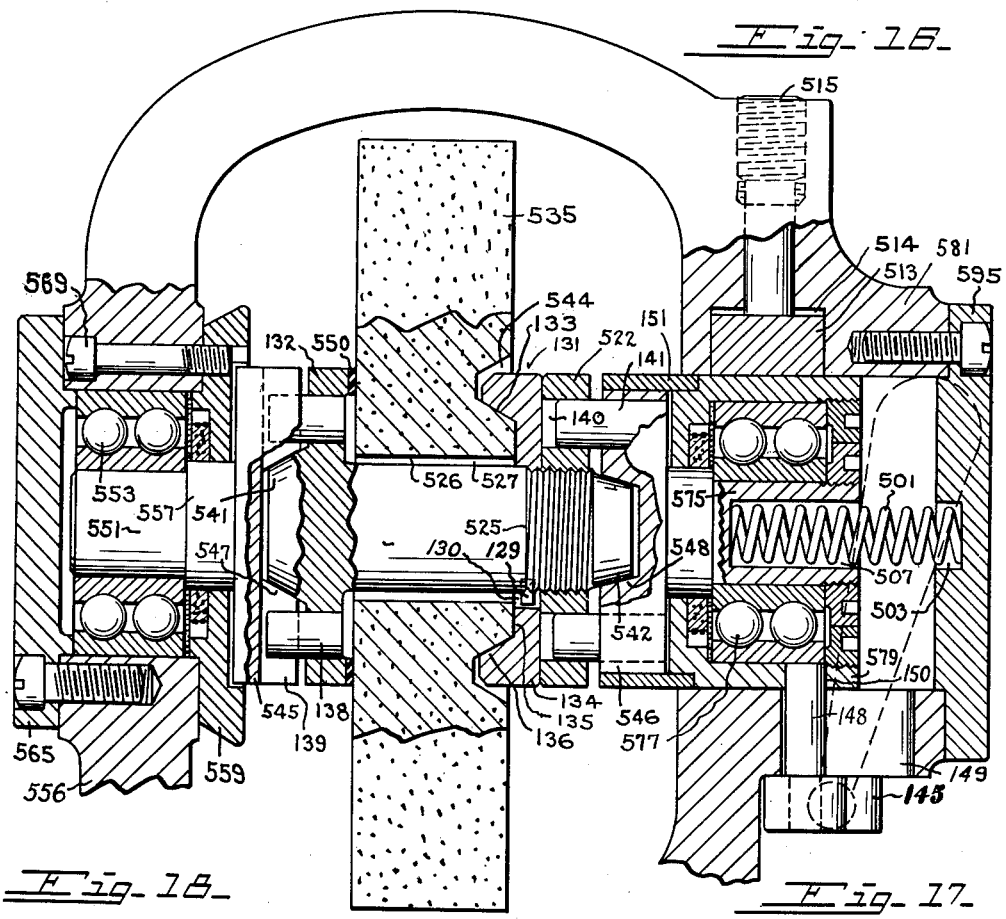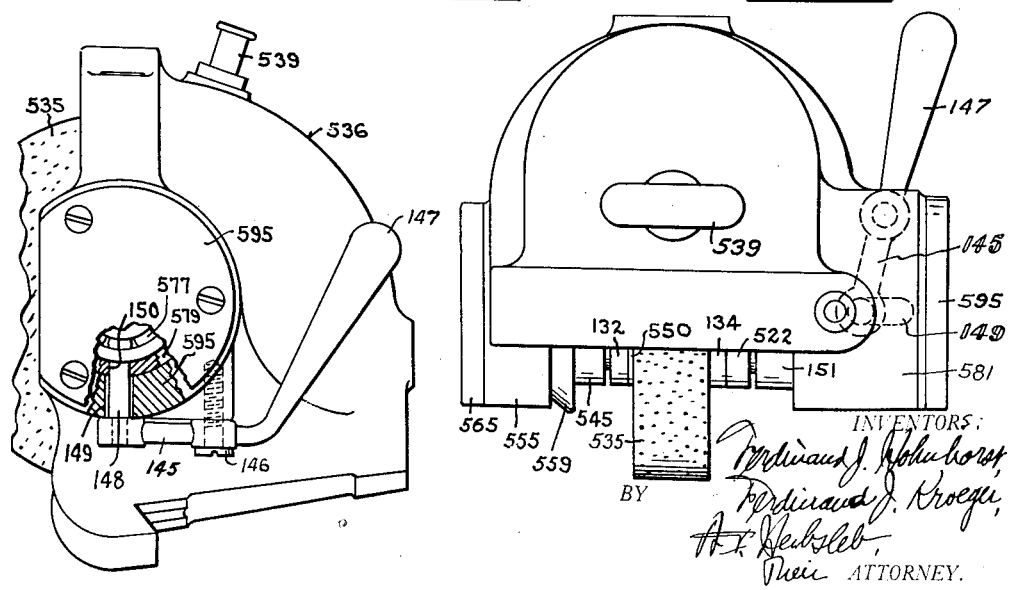

July 18, 1933.    F. J. HOHNHORST ET AL    1,918,392
ABRADING WHEEL AND MOUNTING THEREFOR
Filed March 13, 1930    7 Sheets-Sheet 7
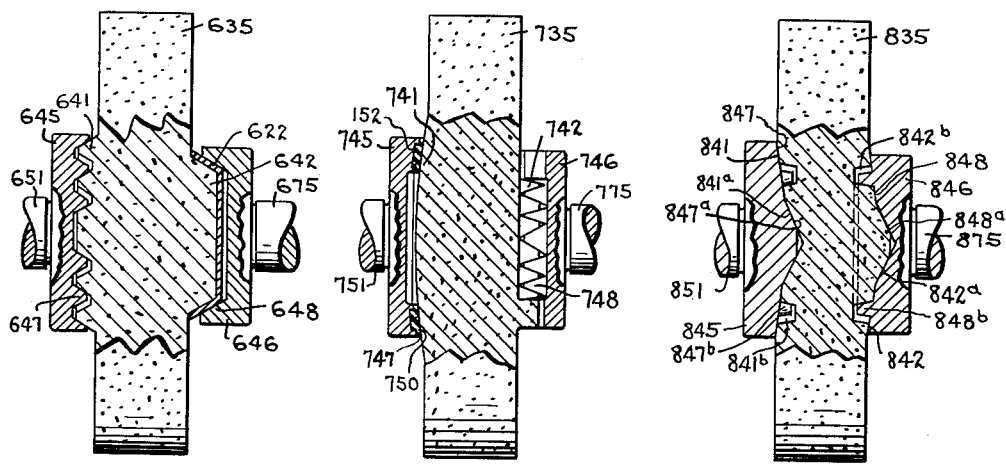
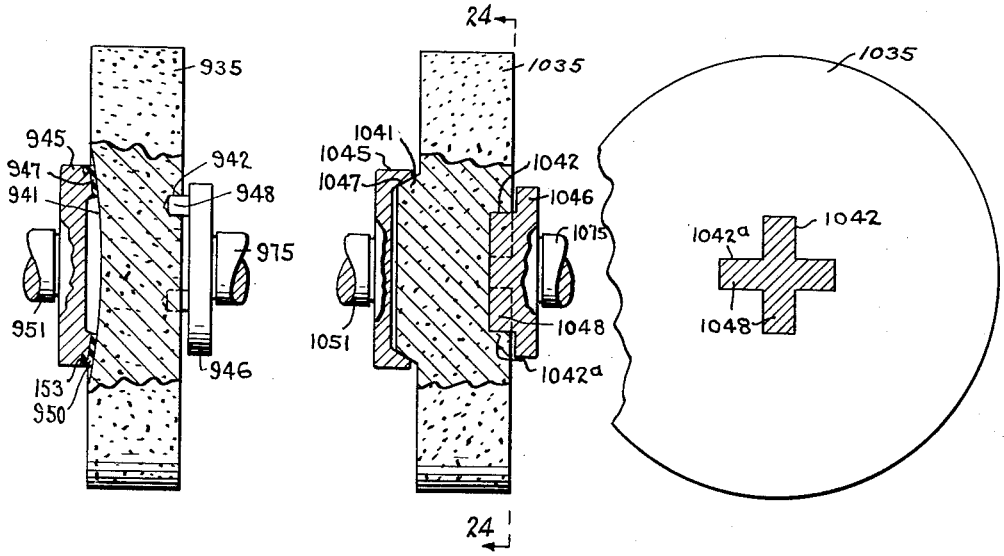

Patented July 18, 1933

1,918,392

UNITED STATES PATENT OFFICE

FERDINAND J. HOHNHORST AND FERDINAND J. KROEGER, OF COVINGTON, KENTUCKY

ABRADING WHEEL AND MOUNTING THEREFOR

Application filed March 13, 1930. Serial No. 435,490.

Our invention relates to abrading wheels of the composite type. Such wheels may be instanced as comprising emery, carborundum and other granular substances suitably bound. Such wheels may be instanced as truing and dressing abrading wheels and as grinding wheels, examples of which are shown and described in United States Letters Patent No. 1,663,703, granted to us March 27, 1928, for mechanism for truing and dressing grinding wheels.

It has been the practice heretofore to center such wheels upon a central shaft, sleeve or support in a central hole in the wheel.

It is the usual practice at present to line the wall of the hole with a soft metal, such as Babbitt metal, and to make the central hole in the metal as concentric and axial with relation to the abrading wheel as is practicable, so as to provide as true a path for the periphery of the abrading wheel as practice will permit.

It has been found in practice that the provision of such hole in the metal in truly central position is difficult and that errors in the location of the hole are frequent owing to the multiplicity of operations in forming the wheel and subsequently pouring the soft metal and forming the hole. It has also been found in practice that pouring the soft metal to form the hole has resulted in unbalancing the wheel due to the pouring of more metal at one side of the hole than at the other.

We have found further that the provision of such a hole has a tendency to weaken the abrading wheel and to cause a cleavage, splitting or breaking of the wheel, or bursting of the wheel when rotated at very high speeds, or when its diameter has been materially reduced by wear.

It is the object of our invention to provide an abrading wheel in which these objections are avoided.

It is the object of our invention further to provide an abrading wheel having a clamping face or clamping faces which tend to resist splitting, breaking, cleavage or bursting of the wheel; further, to provide an abrading wheel having a securing face or securing faces arranged about the axis of the wheel for receiving clamping forces directed toward said axis; further, to provide an abrading wheel and securing means therefor acting on the abrading wheel by lateral pressure to center the abrading wheel; and, further, to provide an abrading wheel and clamping means therefor provided with portions received in the abrading wheel and having rotative connection with the abrading wheel in the plane of the abrading wheel.

It is the object of our invention further to provide novel means for securing abrading wheels to rotative supports; further, to provide novel means for securing the respective sides of abrading wheels to rotative axles; further, to provide novel means for securing abrading wheels between rotative axles; and, further, to provide novel means for mounting and rotatively supporting abrading wheels.

The invention will be further readily understood from the following description and claims, and from the drawings, in which latter:

Fig. 1 is an end elevation, partly in section and partly broken away, showing our invention applied to an exemplified grinding machine.

Fig. 2 is a plan view of our improved device, shown in connection with a grinding wheel partly broken away.

Fig. 4 is a front end elevation of the same.

Fig. 5 is a rear end elevation of the same.

Fig. 6 is an inside elevation, partly in section on the line 6—6 of Fig. 3, and partly broken away, and showing the abrading wheel removed.

Figure 3:
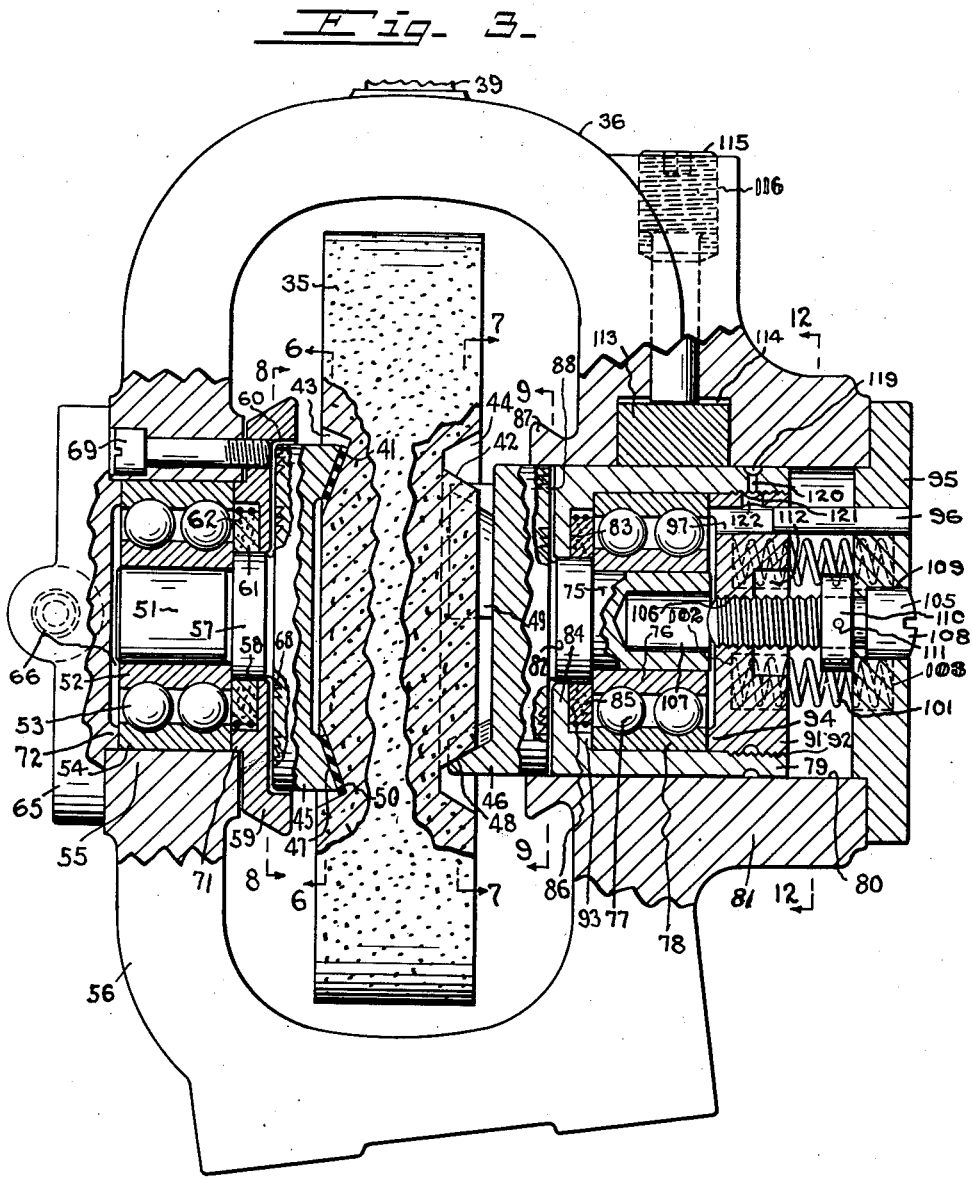
Fig. 3 is an edge elevation of our improved device, partly in axial section taken on the line 3—3 of Fig. 2, and partly broken away.

Figs. 7, 8 and 9 are similar sections, taken respectively on the lines 7—7, 8—8 and 9—9, of Fig. 3.

Figure 10:
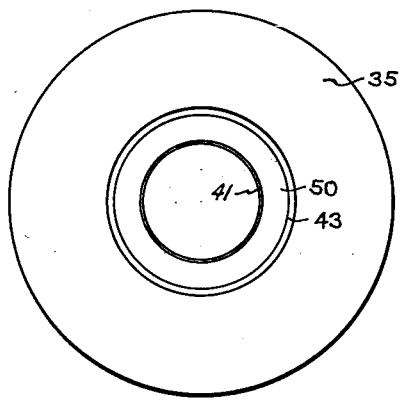

Fig. 10 is a side elevation of one face of the abrading wheel.

Figure 11:
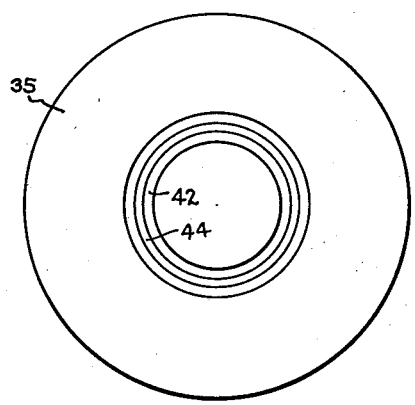

Fig. 11 is a side elevation of the other face of the abrading wheel.

Figure 12:
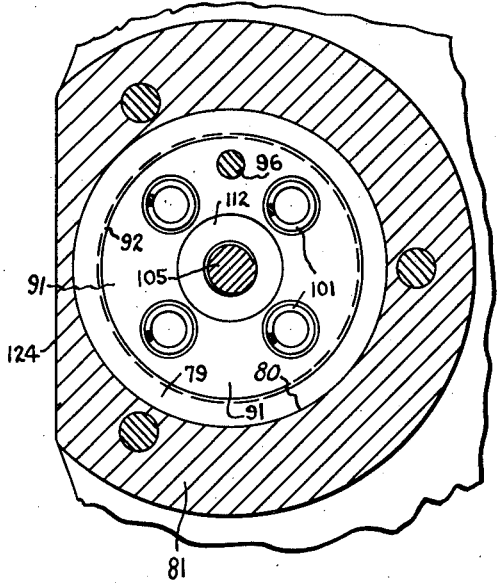

Fig. 12 is a cross-section of our improved device, taken in the plane of the line 12—12 of Fig. 3, partly broken away.

Figure 13:
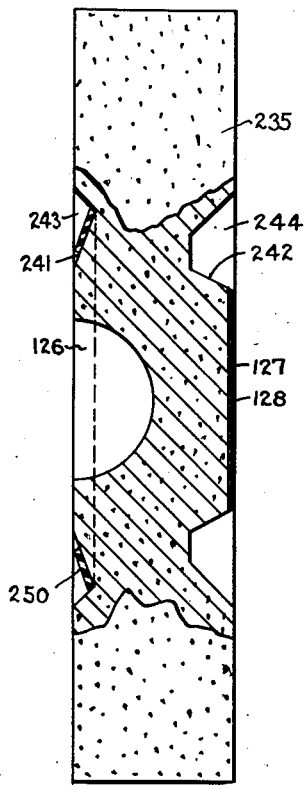

Fig. 13 is an edge elevation, partly in axial section, and partly broken away, showing a modification of our invention.

Fig. 14 is an edge elevation, partly in axial section and partly broken away, showing a further modification of our invention.

Fig. 15 is a similar view showing an additional modification of our invention.

Fig. 16 is an edge elevation, partly in axial section and partly broken away, showing a further modification of our invention.

Fig. 17 is a plan view of the same.

Fig. 18 is an end view of the same.

Fig. 19 is a similar view showing a still further modification of our invention.

Fig. 20 is an edge elevation, partly in axial section and partly broken away, showing a modification embodying features of our invention.

Figs. 21, 22 and 23 are respectively edge elevations, partly in axial section and partly broken away, showing further modifications embodying representations of our invention; and Fig. 24 is a cross-section of the modification shown in Fig. 23, taken on the line 24—24 of Fig. 21.

The invention is exemplified as employed in connection with a so-called grinding or polishing machine employing a rotary abrading or grinding wheel 21 for effecting the grinding or polishing. The work to be ground or polished, which may, for instance, be a shaft, is arranged to be placed between suitable centers of the grinding machine and to be rotated by usual driving means. The work is arranged to be supported in usual manner upon a table 22.

The grinding wheel is journaled upon a suitable slide 23 adjustable toward and from the work-table 22 on guideways 24. Suitable means are provided for positioning the slide and the table.

Traverse is caused between the grinding wheel and the table, instanced as a lateral reciprocating movement imparted to the table in usual manner, as by means of a power driven pinion 25 meshing with the rack 26 secured to a saddle 27, the saddle being slidable on guideways 28, 29, on the frame 30 of the machine. The table moves with the saddle and is pivoted thereon by a pivot 31.

In the present exemplification the grinding wheel 21 is stationarily positioned and rotation is imparted thereto by power means as by a suitable pulley.

The grinding surface of the grinding wheel 21 during use becomes dull or out of true or needs refinishing for other reasons. A rotary abrading wheel 35 is exemplified as such cleaning or sharpening agency for the grinding wheel. The rotary abrading wheel 35 is normally quiescent, rotation being imparted thereto by contact of its periphery with the rotating grinding wheel. This abrading wheel is preferably of a texture much harder than that of the grinding wheel and of smaller diameter than the diameter of the grinding wheel on which it operates.

The rotation imparted to the grinding wheel 21 is instanced as in the direction of the arrow $a$, while the rotation imparted to the abrading wheel 35 by surface contact thereof with the grinding wheel is instanced as in the direction of the arrow $b$. For convenience in the description the wheel 21 is referred to as the grinding wheel and the wheel 35 is referred to as the abrading wheel.

The abrading wheel is instanced as mounted in a fixture 36 clamped by a clamp 37 to a suitable adaptor-plate 38 suitably secured in adjusted positions to the table 22, although other means may be employed for supporting the fixture. The fixture has a carrying handle 39.

The abrading wheel is exemplified as a solid wheel provided with laterally arranged clamping faces arranged to receive coacting clamping parts preferably so arranged as to exert squeezing force upon the central portion of the abrading wheel toward the axis of the abrading wheel, and preferably arranged in such way as to avoid the necessity for the presence of a central hole in the abrading wheel.

Referring to Figs. 1 to 12 inclusive, the abrading wheel is provided with an annular clamping face 41 which is of frusto-conical form and an opposed annular clamping face 42, also of frusto-conical form, the frusto-cones being preferably of different angles. These clamping faces are preferably located in annular grooves 43, 44, in the plane of the abrading wheel. Cooperating clamps 45, 46, have complemental clamping faces 47, 48, complemental respectively with the clamping faces 41, 42, on the abrading wheel.

The clamping faces 41, 47 and 42, 48 form pairs of clamping faces, one or both of which may be conical. One or both of the clutch-faces 47, 48, may be segmental, the clutch-face 48 being shown segmental at 49, for engaging the complemental clamp face on the abrading wheel only partially and in spaced-apart positions or relations so as to aid in centering the abrading wheel between them. One of the clamping faces may be provided with a cushion lining, exemplified as a resilient rubber ring 50, secured to the clamping face 47, as by cementing or pasting the ring to said face. The frusto-conical form of the clamping faces of the abrading wheel and of the clamping faces on the complemental clamps or chucks form centering means for centering the abrading wheel with its axis coincident with the axes of rotation of the clamping plates or chucks 45, 46. The cushion lining aids in centering the abrading wheel and yields to irregularities in thickness or form of the abrading wheel.

The clamp-plate 45 has an axle 51 received securely and centrally in the inner raceway 52 of a ball-bearing 53, the outer raceway 54 of which is centrally received in a bearing-housing 55 in a frame 56. The axle has a concentric enlargement 57, an annular space 58 being around said enlargement, shown formed as an annular internal rabbet in a shield-plate 59 having a depression 60 in which the chuck-plate 45 is received.

A compressible washer 61, for instance a felt washer, is received in the rabbet 58 and is surrounded by a spiral spring 62 pressing inwardly on said washer for urging the various parts of the washer radially toward the enlargement 57 and serving as a lubricant retaining means for the ball-bearing. The washer is pressed between the lateral wall of the annular rabbet 58 and the inner ends of the raceways of the ball-bearing 53.

A cap 65 closes the outer end of the housing 55 and the lubricant-cavity 66 therein in which said ball-bearing is located. A suitable lubricant-receiving fitting 67 is on said cap and communicates with said lubricant-cavity.

The outer face of the clamp-plate 45 is provided with spirally arranged grooves 68, spirally arranged on the outer face of said plate between its axle and its outer periphery, and having an outward spiral curve with the direction of its rotation for causing automatic feeding of any water, slush, grit and dirt away from said axle toward the outer periphery of said plate, for being discharged between the outer periphery of said plate and the shield 59, the annular wall of the depression 60 in said shield arresting outward thrust of said substances so that the same may not be projected to the grinding wheel.

The shield 59 is secured to the housing 55 by means of screws 69 countersunk in said housing and threaded into said shield.

The cap 65 is secured to the housing 55 by means of screws 70 countersunk in said cap and threaded to said housing. The shield is provided with an outwardly extending annular flange 71 and the cap is provided with an inwardly extending annular flange 72 received in the housing 55, the outer raceway 54 being clamped between said flanges.

The clamp-plate 46 has an axle 75 received securely and centrally in the inner raceway 76 of a ball-bearing 77, the outer raceway 78 of which is centrally received in a shell 79 slidable axially in a guideway 80 of a bearing-housing 81 in the frame 56.

The axle has a concentric enlargement 82, an annular space 83 being around said enlargement, shown formed by an annular internal rabbet in the inner wall 84 of the shell.

A compressible washer 85, for instance a felt washer, is received in the annular space 83 and is surrounded by a spiral spring 86 pressing inwardly on said washer for urging the various parts of the washer radially toward the enlargement 82 and serving as a lubricant retaining means for the ball-bearing. The washer is pressed between the lateral wall of the annular rabbet 83 and the inner ends of the raceways of the ball-bearing 77.

The inner end of the guideway 80 extends normally inwardly beyond the shell 79 for forming an annular shield 87 about the chuck-plate 46.

The outer face of the chuck or clamp-plate 46 is provided with spirally arranged grooves 88, spirally arranged on the outer face of said plate between its axle and its outer periphery, and having an outward spiral curve with the direction of its rotation for causing automatic feeding of any water, slush, grit and dirt away from said axle toward the outer periphery of said plate, for being discharged between said outer periphery and the annular shield 87, which latter arrests outward thrust of said foreign substances so that the same may not be projected to the grinding wheel.

A plug 91 is received in the shell 79, being threaded therein, as at 92. The shell is provided with an inner annular shoulder 93 and the plug is provided with the inner annular flange 94, the outer raceway 78 being clamped between said shoulder and said flange.

Axial movement is permitted the shell in the guideway 80 for moving the clamping plate or chuck 77 toward and from the clamping plate or chuck 46 for clamping a wheel between said clamping faces or chucks or releasing a wheel therebetween.

A cap 95 is provided with a pin 96, preferably held in axial direction to said cap, as by having a tight fit in a hole therein. The pin is received in a hole 97 in the plug 91, the plug having movement in axial direction on said pin and being prevented from rotating thereby.

Springs 101 normally urge the shell and consequently the clamp-plate or chuck 46 toward its complemental clamp plate or chuck, for clamping the abrading wheel between them. These springs are shown as helical springs, the ends of the springs being respectively received in recesses 102 in the plug 91 and in recesses 103 in the cap 95. These springs normally urge engagement between the clamping faces or chucks and the abrading wheel to securely hold and center the abrading wheel between said clamping plates or chucks so as to cause combined rotations of the axles at the respective sides of the abrading wheel and to cause true rotation of the abrading wheel.

Means are provided for separating the clamping plates or chucks when it is desired to release an abrading wheel therebetween or to supply a new abrading wheel therebetween. These means are exemplified as a screw 105 having threaded engagement 106 with the plug 91, the inner end of the screw being slidingly received in an axial hole 107 in the axle 75. The screw has a head 108 preferably countersunk in a recess 109 of the cap 95, and is provided with a collar 110 secured thereto, as by a pin 111, at the inner end of said cap, for axially positioning the screw to the cap, so that rotation of the screw causes axial movement of the plug 91, the shell 79, the ball-bearing 77, the axle 75, and the chuck or clamp plate 46. The collar 110 is received in a recess 112 in the plug when the plug is moved outwardly to sufficient extent.

The threads 92 are preferably coarse-pitch threads having loose complemental fit so that when the screw is rotated for permitting the springs 101 to move the chuck or clutch-plate 46 inwardly, a release of engagement between the threads of the screw and the complemental threads of the nut in the plug caused by clamping contact of the chucks or clamp-plates with the abrading wheel, will be felt by the operator, due to momentary free rotation of the screw, so as to avoid clamping force upon the chucks or clamping plates being exerted by the screw. It is preferred that such clamping force be exerted by the springs, although if desired a positive clamping pressure may be exerted by the screw. The spring pressure is greater than the normal resistance of the cushion 50.

The screw also positively prevents separation between the clamp-plates if abnormally excess lateral or tilting pressure be exerted upon the periphery of the abrading wheel, preventing disarrangement and release of the abrading wheel and the securing parts thereof.

When the chuck or clamping plate 46 has been moved inwardly for proper clamping of the abrading wheel, the shell 79 is preferably clamped in the housing 81, accomplished in the present exemplification by means of a clamping shoe 113 located in a recess 114 in the housing and arranged to clamp upon the shell. A screw 115 is threaded in a threaded hole 116 in the housing and is arranged to clamp upon the shoe for clampingly fixing the shell in the housing.

The cavity in the shell 79 is a lubricant-cavity, the lubricant being supplied through a lubricant-fitting 117, through a passage 118 extending therefrom in the housing into an annular passage 119 in the outer periphery of the shell, through radial passages 120 in the shell into an annular passage 121 in the outer periphery of the plug 91, and through a radial passage 122 in the plug to the hole 97 in the latter, the inner end of said hole communicating with the interior of the shell.

The clamping force exerted upon the wheel is inwardly from the respective faces of the wheel and preferably radially toward its axis. Such clamping forces resist radial separation between the parts of the wheel and aid in holding the wheel together. My improved construction also permits use of a maximum diameter of the wheel in performing its functions and allows the wheel to be worn down to greatest extent toward its center without weakening the central portion of the wheel or rendering it liable to break, and leaves only a small unused portion of the wheel.

The side of the bearings and associated parts toward the point of use of the wheel are preferably truncated or abbreviated at the respective sides of the wheel, as shown at 123, 124, so as to permit closer approach of the middle portion of the wheel toward the object upon which it is acting and permitting a greater portion of the wheel to be worn away in use.

If desired, the side of the central portion of the wheel may be recessed, as at 126, in Fig. 13, parts shown in this figure being indicated by similar reference numerals raised to the series 200. The recess may extend to suitable extent into or through the wheel for reducing the weight of the wheel. The central face 127 of the frusto-cone may be sunk below the plane of the side face of the wheel, so that a label 128 may be pasted thereon without danger of being damaged by abrasion in stacking the wheels.

In the modification shown in Fig. 14, the clamping means for the abrading wheel are shown passing through the abrading wheel. In this modification similar parts are designated by similar reference numerals raised to the series 300. The clamp-plate 345 is provided with a central threaded portion 322, forming a nut, part of the nut being formed by an inwardly extending boss 323 received in a lateral recess 324 in the abrading wheel. A bolt 325 extends inwardly rigidly and centrally from the chuck-plate 346 and has a threaded end received in the nut. The bolt is received through a central hole 326 in the wheel. There is preferably an annular space 327 between the wall of this hole and said bolt, as the hole is preferably not for the purpose of centering the wheel, but for providing a space through which connecting parts of the clamp may extend.

The peripheries of the clamp-plates 345, 346, are provided with recesses 328 for spanner wrenches by means of which the clamp-plates may be relatively rotated for clamping and unclamping the wheel.

In this instance the springs 101, cap 95 and screw 105 may be dispensed with, and the plug 391 provided with a knob 329, by means of which the shell 379, the clamp-plate 346 and the parts supported thereby may be moved manually in axial directions upon release of the clamp-shoe 313, so as to move the bolt 325 out of the hole in the wheel with sufficient clearance to permit edgewise removal of the wheel from the fixture. The bolt 325 may be moved inwardly upon replacement of another wheel for coaction with the nut 322.

We have in Figs. 1 to 14 inclusive and 16 to 24 inclusive, illustrated our invention in connection with separate axles at the respective sides of the wheel. If desired, however, a single axle or shaft may be employed at one side of the wheel, an illustration of which is exemplified in Fig. 15. In this exemplification similar parts are designated by similar reference numerals raised to the series 400.

The chuck or clamp-plate 446 is on an axle or shaft 475, journaled in ball-bearings 477, in a housing 481 of a fixture 436. The chuck or clamp-plate 445 is clamped toward the chuck or clamp-plate 446, as by means of a clamp-bolt 425, received through the plate 445, and threaded in a threaded extension 422 extending centrally from the chuck or clamp-plate 446, the extension and bolt being received in an axial hole 426 in the wheel 435. There may be an annular space 427 between the wall of this hole and said extension and bolt, as the hole in this instance is preferably not for the purpose of centering the wheel, but primarily for providing a space through which the connecting parts of the clamp may extend. The wheel may be provided with a central recess 424 into which a central projection 423 of the chuck or clamp plate 445 is received.

Referring to Figs. 16, 17 and 18, similar parts are designated by similar reference numerals raised to the series 500. In this modification the abrading wheel is provided with a releasable part on which the faces of the abrading wheel, coacting with the coacting clamping faces, are located. This releasable part is arranged to be secured to the abrading wheel proper prior to its being received in the fixture or machine, and to be removed from the abrading wheel after the abrading wheel has been worn and is of no further use. A number of these releasable parts may be employed and fixed to a series of the abrading wheels for ready insertion and removal of the abrading wheels as required. The releasable part forms a releasable central chucking member for the abrading wheel.

The releasable central chucking member 131 comprises a bolt 525 received through a central hole 526 in the abrading wheel. This hole is preferably of greater diameter than the bolt, forming an annular clearance space 527, for permitting the bolt to be centered in the abrading wheel by the frusto-conical faces. The head 132 of the bolt is preferably flat, coacting with the correspondingly shaped side of the abrading wheel, there being preferably a cushion washer 550 between the head of the bolt and said side. The other side of the abrading wheel is provided with a frusto-conical clamping face 133, concentric with the hole 526, and located in an annular groove 544 in the abrading wheel. A clamp-plate 134 is provided with a socket 135, having a frusto-conical clamping face 136 complemental to the clamping face 133. A nut 522 is received over the threaded end of the bolt and clamps the various parts of the composite abrading wheel including the central chucking part thereof together, drawing the parts relatively laterally, and centering the composite abraiding wheel on its chucking member. Combined rotation between the bolt 525 and the clamp-plate 134 is insured by a pin 129 on the bolt extending into a slot 130 in the clamp-plate.

The respective ends of the central chucking member are provided with frusto-conical clamping faces 541, 542, with which complemental clamping faces 547, 548, of complemental clamps 545, 546, coact. The flange 132 may be provided with pins 138 received in cross-slots 139 in the clamp 545. The nut 522 is provided with holes 140 in which pins 141 extending from the clamp 546 are received. The threads between the bolt and the nut are in such direction as to tend to tighten the nut on rotation of the abrading wheel.

In this modification the axle 575 and the clamp 546 thereon are urged toward the abrading wheel by a spring 501 received in an axial hole 507 in the axle, and located between the bottom of said hole and a recess 503 in the cap 595. The spring normally urges clamped relation between the complemental clamping faces on the axles and on the releasable chuck-member of the abrading wheel. A clamp-shoe 513 in a recess 514 in the bearing surrounding the shell 579 is arranged to be clamped against the shell by means of the clamp-bolt 515.

A releasing means for the abrading wheel is exemplified as a lever 145, pivoted to the frame on a shoulder-bolt 146 threaded in the frame. The lever has a handle 147 and is provided with an actuating pin 148 extending through a slot 149 in the frame and received in a hole 150 in the shell. Inward movement of the handle causes outward movement of the shell and of the clamp 546 connected therewith, permitting ready insertion and removal of the abrading wheel with its chucking member.

The shell has an annular flange 151, fixed thereto. The shell and flange slide in axial direction in the bearing-housing 581 when actuated by the lever.

In the modification shown in Fig. 19, in which similar parts are designated by similar reference numerals raised to the series 600, one of the faces of the wheel 635 is provided with annular teeth 641, the chuck or clamping parts 645 being provided with complemental annular teeth 647 preferably pressing upon the outer faces of the annular teeth on the wheel. The opposite face of the wheel is provided with a frusto-conical bulge 642, shown provided with a protective washer 622, for instance of Babbitt metal. The complemental chuck or clamp plate 646 is provided with a complemental clamping recess 648.

In the modification exemplified in Fig. 20 in which similar parts are designated by similar reference numerals raised to the series 700, one face of the abrading wheel is provided with a frusto-spherical bulge 741, and the complemental chuck or clamp-plate 745 is provided with a complemental frusto-spherical recess 747. The other side of the abrading wheel is provided with an annular row of radially arranged teeth 742, and the complemental chuck or clamp-plate 746 is provided with complemental teeth 748.

While we prefer that at least one of the clamping faces on the abrading wheels shall have inward pressure exerted thereon by the clamping-plates or chucks, we have exemplified centering engaging faces in which such inward pressure is dispensed with. Thus in Fig. 21, in which similar parts are designated by similar reference numerals raised to the series 800, one side of the abrading wheel is provided with conical faces 841, 841a, having different angles and with annularly arranged holes 841b, the complemental chuck or clamp-plate 845 being provided with complemental engaging faces 847, 847a, and annularly arranged pins 847b. The other side of the abrading wheel is exemplified as having a conical bulge 842, 842a, of a plurality of angles, and an annularly arranged groove 842b, the complemental chuck or clamp-plate 846 being provided with a complemental conical recess 848, 848a, having different angularities, and an annularly arranged ridge 848b received in the groove 842b.

In the modification shown in Fig. 22, in which similar parts are designated by similar reference numerals raised to the series 900, one side of the abrading wheel is provided with a frusto-spherical recess 941 in which a complemental frusto-spherical bulge 947 of a chuck or clamp-plate 945 is received. The opposite face of the abrading wheel may be provided with a series of holes 942, for instance four in number, arranged around the axis of the wheel, in which pins 948 of a complemental chuck or clamp-plate 946 are received.

In the modification shown in Figs. 23 and 24 in which similar parts are designated with similar numerals raised to the series 1000, one side of the abrading wheel is provided with a frusto-conical bulge 1041 received in a complemental frusto-conical recess 1047 of a chuck or clamp-plate 1045. The other side of the abrading wheel may be provided with a recess 1042 having a plurality of divergent branches 1042a, in which complemental arms 1048 of a complemental chuck or clamp-plate 1046 are received.

The various forms of clamping faces may be selected for similar clamping faces on both sides of the wheel, or for any selected ones of the clamping faces on the respective sides of the wheels, it being preferred, however, that one or both of the clamping faces on the wheel shall be such as to exert pressure toward the axis of the wheel regardless of whether or not the wheel at said axis is provided with a hole or is partly or wholly recessed.

The cushion lining 50 may be secured to any of the clamping faces. It may be secured to either of the clamps on the machine or to the complemental clamping faces on the abrading wheel. Thus in Fig. 20 the cushion ring 750 has its face next to the clamping face 741 let into an annular dovetail groove 152 in said clamping face, and in Fig. 22, the cushion ring 950 has its outer edge let into an annular groove 153 at the outer edge of the clamping face 947. The cushion rings 750, 950, are retained in said respective grooves and may be used in connection with quite a number of abrading wheels before needing replacement.

In our improved device the clamping faces on the abrading wheel are formed on the abrading wheel in the formation of the composite substance of the wheel in making the wheel, for instance, in a mold for shaping the wheel, so that the clamping faces are formed with the single operation of the formation of the wheel, insuring concentricity of the formation with the axis of the wheel. The errors incident in actual practice to the pouring of soft metal in forming centering holes for wheels of this nature as heretofore generally practiced are avoided and truer and better balanced wheels provided.

By means of our invention further wheels of the character mentioned are provided in which the clamping faces act to hold the parts of the wheel together and avoid the bursting of the same; and further, the wheels are centrally positioned in their fixture by the act of clamping the same in place; and further, wheels are provided whose strength is enhanced as the wheel is worn down instead of being weakened as has heretofore been the practice, due to the fact that in wheels now in general use the wearing away of the wheel leaves a gradually reducing ring continually reducing in strength with the reduction in diameter of the wheel; and further, wheels can be used down to a smaller diameter than has heretofore been the practice.

By means of our improved invention further abrading wheels may be secured in place and substituted with the assurance of accuracy in the setting of the same in greatly reduced time.

The present invention provides a composite wheel of the character described capable of being quickly attached to its supporting means and centrally located therein; provides a wheel in which breakage, splitting cleavage or bursting is reduced to the minimum; provides a wheel capable of use to maximum extent toward its axis; provides a wheel which is economical in manufacture and of great utility; and provides convenient and novel means, whereby a wheel of the character mentioned is mounted and dismounted, which are economical and strong and which are readily and accurately operated.

Having thus fully described our invention, what we claim as new, and desire to secure by Letters Patent, is:

1. A straight-sided abrading wheel having an annularly arranged frusto-conical clamping face in its side face sloping outwardly toward the axis of the wheel and terminating within said side face and an annularly arranged groove in said side face about said clamping face, a chuck having a frusto-conical end recess, the peripheral wall of which has an inner frusto-conical wedge clamping face complemental to said first-named frusto-conical wedge clamping face and received thereabout, and means for causing lateral pressure in axial direction between said chuck and said abrading wheel for wedging pressure of said chuck wall toward the axis of said wheel, with the respective ends of said chuck wall spaced from the bottom of said groove and the outer end of said first-named frusto-conical wedge clamping face when said chuck is in clamped relation.

2. A straight-sided abrading wheel having an annularly arranged frusto-conical clamping face in its side face sloping outwardly toward the axis of the wheel and terminating within said face and an annularly arranged groove in said side face about said clamping face, a chuck having a frusto-conical end recess, the peripheral wall of which has an inner frusto-conical wedge clamping face complemental to said first-named frusto-conical wedge clamping face and received thereabout, and means for causing lateral pressure in axial direction between said chuck and said abrading wheel for wedging pressure of said chuck wall toward the axis of said wheel, with the respective ends of said chuck wall spaced from the bottom of said groove and the outer end of said first-named frusto-conical wedge clamping face when said chuck is in clamped relation, and the side faces of said abrading wheel outside said groove supporting one another throughout their areas when said abrading wheels are stacked one upon the other.

3. In combination, an abrading wheel having an annularly arranged wedge clamping face about the axis of rotation of the wheel and an annular groove about said wedge clamping face and a complemental rotative wedge clamping part having an end recess and a wedge clamping wall about said recess received in said groove, said wedge clamping wall having an inner wedge clamping face complemental to said first-named wedge clamping face and of such diameter with relation thereto that there are spaces in axial directions between the outer end of said wall and the bottom of said groove and between the outer end of said first-named wedge clamping face and the bottom of said recess when said wedge clamping part and said abrading wheel are in clamped relation.

4. In combination, an abrading wheel having annularly arranged clamping faces at its opposite side faces wedgingly sloping with relation to said side faces and annularly arranged grooves in said opposite side faces outside said clamping faces, rotative clamping parts at said respective sides having outer peripheral walls provided with complemental wedgingly sloped clamping faces forming recesses in the ends of said clamping parts, and means causing pressure between said rotative clamping parts, the diameter of said complemental wedgingly sloped clamping faces with relation to the diameters of said first-named clamping faces being such that there are spaces in axial directions between the bottoms of said grooves and the ends of said walls and between the outer ends of said first-named clamping faces and the bottoms of said recesses when said clamping parts and said abrading wheel are in clamped relation.

5. An abrading wheel which is solid throughout its diameter and is provided with clamping faces at its respective sides about its axis of rotation, and coacting clamping faces at the respective sides of the abrading wheel provided with centering means for said abrading wheel.

6. In combination, an abrading wheel which is solid throughout its diameter and is provided with laterally presented clamping faces, axles at the respective sides of said abrading wheel, clamping parts on the proximate ends of said respective axles complemental to said clamping faces, said clamping parts and all connections therebetween wholly separated by the body of said abrading wheel, means for clamping said abrading wheel between said clamping parts, and separating means whereby to cause separation between said clamping parts for release of said abrading wheel.

7. In combination, an abrading wheel which is solid throughout its diameter, centering means for said abrading wheel comprising oppositely laterally presented clamping faces including a frusto-conical centering face about the axis of said abrading wheel, axles at the respective sides of said abrading wheel, clamping parts on the proximate ends of said respective axles complemental to said clamping faces, said clamping parts and all connections therebetween wholly separated by the body of said abrading wheel, and means whereby to cause approach between said clamping parts and thereby center said abrading wheel with relation to said axles.

8. In combination, an abrading wheel provided with a laterally presented clamping face, an axle at the side of said abrading wheel, a clamping part on said axle complemental to said clamping face, an axially slidable shell about said axle, a bearing between said axle and said shell including means connecting said axle and said shell in axial direction, a housing in which said shell is slidable, means to move said shell toward said clamping face for clamping coaction between said clamping part and said clamping face, and withdrawing means having operative connection with said shell for moving said shell in opposite direction for release of said clamping face.

9. In combination, an abrading wheel provided with a laterally presented clamping face, an axle at the side of said abrading wheel, a clamping part on said axle complemental to said clamping face, an axially slidable shell about said axle, a bearing between said axle and said shell including means connecting said axle and said shell in axial direction, a housing in which said shell is slidable, spring means moving said shell toward said clamping face for clamping coaction between said clamping part and said clamping face, clamping means clamping said shell in said housing, and withdrawing means having operative connection with said shell for moving said shell in opposite direction for release of said clamping face.

10. In combination, an abrading wheel provided with laterally presented clamping faces at its respective sides, a frame provided with a recess in which said abrading wheel is received, a bearing in said frame at each side of said recess, an axle in each of said bearings, oppositely presented clamping parts complemental to said clamping faces at the proximate ends of said axles, a shell axially slidable in one of said bearings, one of said axles journaled in said shell and axially movable therewith, spring means normally moving said shell toward said recess for clamping engagement between said clamping parts with said clamping faces, and means for oppositely moving said shell against the resistance of said spring means for release of said clamping parts from said clamping faces.

11. In combination, an abrading wheel provided with laterally presented clamping faces at its respective sides, bearings at the respective sides of said abrading wheel, axles in said bearings, and oppositely presented chuck-plates on the proximate ends of said axles complemental to said clamping faces, the outer faces of said chuck-plates provided with spiral grooves spirally arranged outwardly with the directions of rotations of said chuck-plates for moving refuse toward the peripheries of said chuck-plates upon rotation of said chuck-plates.

12. In combination, an abrading wheel provided with a laterally presented clamping face, an axle at the side of said abrading wheel, a clamping part on said axle complemental to said clamping face, an axially slidable part about said axle, a bearing between said axle and said axially slidable part, a support on which said axially slidable part is located, and means to move said axially slidable part toward said clamping face for clamping coaction between said clamping part and said clamping face.

13. In combination, an abrading wheel provided with a laterally presented clamping face, an axle at the side of said abrading wheel, a clamping part on said axle complemental to said clamping face, an axially movable part about said axle, a bearing between said axle and said axially movable part, a support on which said axially movable part is axially movable, spring means moving said axially movable part toward said clamping face for clamping coaction between said clamping part and said clamping face, and securing means for securing said axially movable part on said support.

14. In combination, an abrading wheel provided with laterally presented clamping faces at its respective sides, a frame provided with a recess in which said abrading wheel is received, a bearing in said frame at each side of said recess, an axle in each of said bearings, oppositely presented clamping parts complemental to said clamping faces at the respective ends of said axles, one of said axles movable axially, spring means normally moving said axle axially toward said recess for clamping engagement between said clamping parts and said clamping faces, and means for oppositely moving said axle against the resistance of said spring means for release of said clamping parts from said clamping faces.

FERDINAND J. HOHNHORST.
FERDINAND J. KROEGER.